(12) United States Patent
Kojima et al.

(10) Patent No.: US 11,299,431 B2
(45) Date of Patent: Apr. 12, 2022

(54) CERAMIC SINTERED BODY, INSERT, CUTTING TOOL, AND FRICTION STIR WELDING TOOL

(71) Applicant: NGK SPARK PLUG CO., LTD., Nagoya (JP)

(72) Inventors: Yoshito Kojima, Nagoya (JP); Hiroshi Yonekura, Nagoya (JP); Yusuke Katsu, Nagoya (JP); Takeshi Mitsuoka, Nagoya (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 0 days.

(21) Appl. No.: 16/639,056

(22) PCT Filed: Sep. 18, 2018

(86) PCT No.: PCT/JP2018/034497
§ 371 (c)(1),
(2) Date: Feb. 13, 2020

(87) PCT Pub. No.: WO2019/065372
PCT Pub. Date: Apr. 4, 2019

(65) Prior Publication Data
US 2020/0223758 A1 Jul. 16, 2020

(30) Foreign Application Priority Data
Sep. 27, 2017 (JP) .............................. JP2017-186214

(51) Int. Cl.
*C04B 35/56* (2006.01)
*B23B 27/14* (2006.01)
*C04B 41/50* (2006.01)

(52) U.S. Cl.
CPC .......... *C04B 35/5626* (2013.01); *B23B 27/14* (2013.01); *C04B 41/5061* (2013.01);
(Continued)

(58) Field of Classification Search
CPC ............ C04B 35/5626; C04B 41/5061; C04B 41/5068; C04B 2235/3217; C04B 2235/3244; C04B 2235/765; B23B 27/14
See application file for complete search history.

(56) References Cited

U.S. PATENT DOCUMENTS 4,358,516 A * 11/1982 Lange ............... H01M 10/3918
429/320
4,419,311 A 12/1983 Claussen et al.
(Continued)

FOREIGN PATENT DOCUMENTS

CN 102712542 A 10/2012
EP 2 772 472 A1 9/2014
(Continued)

OTHER PUBLICATIONS

Japan Patent Office, Office Action (Notice of Reasons for Refusal) ssued in corresponding Application No. JP 2019-507368 dated Oct. 11, 2019.
(Continued)

*Primary Examiner* — Karl E Group
*Assistant Examiner* — Cameron K Miller
(74) *Attorney, Agent, or Firm* — Stites & Harbison, PLLC; Jeffrey A. Haeberlin; James R. Hayne (57) ABSTRACT

Provided is a ceramic sintered body having high wear resistance and chipping resistance. Also provided are an insert, a cutting tool and a friction stir welding tool, each of which uses such a high-performance ceramic sintered body. The ceramic sintered body includes $Al_2O_3$ (alumina), WC (tungsten carbide) and $ZrO_2$ (zirconia), wherein Zr (zirconium) element is present at either one or both of: (1) a grain boundary between crystal grains of the $Al_2O_3$; and (2) a grain boundary of crystal grains of the $Al_2O$ and crystal grains of the WC, wherein the ceramic sintered body contains 55.0 to 97.5 vol % of the WC, 0.1 to 18.0 vol % of the
(Continued)

$ZrO_2$, and the balance being the $Al_2O_3$, and wherein the $ZrO_2$ is in a phase of tetragonal structure (T) or a mixed phase of tetragonal structure (T) and monoclinic structure (M).

7 Claims, 4 Drawing Sheets

(52) U.S. Cl.
CPC .. *C04B 41/5068* (2013.01); *C04B 2235/3217* (2013.01); *C04B 2235/3244* (2013.01); *C04B 2235/765* (2013.01)

(56) References Cited

U.S. PATENT DOCUMENTS

| | | |
|---|---|---|
| 2012/0295113 A1 | 11/2012 | Kurizoe et al. |
| 2014/0242383 A1* | 8/2014 | Moteki ................ C04B 35/119 428/338 |
| 2016/0023952 A1 | 1/2016 | Moteki et al. |
| 2016/0052827 A1 | 2/2016 | Matsuda et al. |

FOREIGN PATENT DOCUMENTS

| | | | |
|---|---|---|---|
| JP | S57-100976 A | | 6/1982 |
| JP | H03-290356 A | | 12/1991 |
| JP | 2006-175561 A | | 7/2006 |
| JP | 2014-198637 A | | 10/2014 |
| JP | 5654714 B | | 1/2015 |
| JP | 2016-113320 A | | 6/2016 |
| JP | 2016113320 | * | 6/2016 |
| WO | 2014/002743 A1 | | 1/2014 |

OTHER PUBLICATIONS

European Patent Office, Search Report issued in corresponding Application No. 18863044.6 dated May 17, 2021.
The State Intellectual Property Office of People's Republic of China, The First Office Action issued in corresponding Application No. 201880061975.1, dated Aug. 16, 2021.

* cited by examiner

CERAMIC SINTERED BODY, INSERT, CUTTING TOOL, AND FRICTION STIR WELDING TOOL

FIELD OF THE INVENTION

The present invention relates to a ceramic sintered body, an insert, a cutting tool, and a friction stir welding tool.

BACKGROUND ART

Ceramic materials have been applied to e.g. cutting tools for high-speed machining of cast iron. Typical examples of the cutting tools for high-speed machining of cast iron are alumina-based tools, silicon nitride-based tools and cBN tools. The following efforts are being made to improve the wear resistance and chipping resistance of these tools.

First, an explanation will be given of the alumina-based tools. As one type of alumina-based tool, there is known a so-called white ceramic-based tool which is formed of simple alumina or alumina-zirconia complex. The white ceramic-based tool is high in hardness and chemical stability and thus is superior in wear resistance (see Patent Document 1).

As another type of alumina-based tool, there is known a so-called black ceramic-based tool which is formed of alumina containing hard disperse particles of titanium carbide etc. as an alumina grain growth suppression component. The black ceramic-based tool is high in hardness and strength and thus is superior in wear resistance to the white ceramic-based tool (see Patent Document 2).

As still another type of alumina-based tool, there is known a tool of alumina containing tungsten carbide and zirconia. Since this tool is high in not only strength and hardness but also thermal conductivity, it has been proposed to use this tool in machining applications of difficult-to-cut heat-resistant alloys (see Patent Document 3).

Next, an explanation will be given of the silicon nitride-based tools. The silicon nitride-based tools are high in toughness and low in thermal expansion coefficient and thus is superior in chipping resistance. The silicon nitride-based tools have accordingly been used in a wide range of applications from finishing processing to rough processing of cast iron (see Patent Document 4).

Further, an explanation will be given of the cBN tools. The cBN tools are formed using cBN, which exhibits good terminal properties and good high-temperature characteristics, and thus are superior in terms of compatibility between wear resistance and chipping resistance (see Patent Document 5).

PRIOR ART DOCUMENTS

Patent Document

Patent Document 1: Japanese Laid-Open Patent Publication No. S57-100976

Patent Document 2: Japanese Laid-Open Patent Publication No. H3-290356

Patent Document 3: Japanese Patent No. 5654714

Patent Document 4: Japanese Laid-Open Patent Publication No. 2006-175561

Patent Document 5: Japanese Laid-Open Patent Publication No. 2014-198637

SUMMARY OF THE INVENTION

Problems to be Solved by the Invention

The above various tools have the following problems.

The alumina-based tools are high in wear resistance, but are low in toughness and thus inferior in chipping resistance. For this reason, the use of the alumina-based tools is limited to less-load processing applications such as finishing processing. Although the tools disclosed in Patent Documents 1 and 2 are strengthened by the grain growth suppression effects of zirconia or titanium carbide, each of these disclosed alumina-based tools still has a problem in terms of wear resistance and thus are limited for use in finishing processing applications. The tool disclosed in Patent Document 3 is more strengthened than the tools disclosed in Patent Documents 1 and 2, but is high in thermal expansion coefficient because of its high alumina content and thus interior in chipping resistance.

The silicon nitride-based tools are high in chipping resistance, but is high in reactivity with workpiece and thus inferior in wear resistance. In finishing processing applications, the wear resistance of the silicon nitride-based tools is inferior to the wear resistance of the alumina-based tools or the cBN tools. For this reason, the use of the silicon nitride-based tools is limited to rough processing or intermittent processing applications.

The cBN tools is higher in chipping resistance and wear resistance than the silicon nitride-based tools. However, the cBN tools are produced by high-pressure synthesis methods and thus are high in cost.

In view of the above circumstances, it is an object of the present invention to provide a ceramic sintered body having high wear resistance and chipping resistance. It is also an object of the present invention to provide an insert, a cutting tool and a friction stir welding tool, each of which uses such a high-performance ceramic sintered body. The present invention can be embodied in the following aspects.

Means for Solving the Problems (1) According to one aspect of the present invention, there is provided a ceramic sintered body comprising $Al_2O_3$, WC and $ZrO_2$, wherein Zr element is present at either one or both of: (1) a grain boundary between crystal grains of the $Al_2O_3$; and (2) a grain boundary between crystal grains of the $Al_2O_3$ and crystal grains of the WC, wherein the ceramic sintered body contains 55.0 to 97.5 vol % of the WC, 0.1 to 18.0 vol % of the $ZrO_2$, and the balance being the $Al_2O_3$, and wherein the $ZrO_2$ is in a phase of tetragonal structure or a mixed phase of tetragonal and monoclinic structures.

This ceramic sintered body can be produced by the same method as ordinary ceramic sintered bodies, such as normal pressure firing, hot pressing, HIP (hot isostatic pressing) or the like. Hence, a tool with this ceramic sintered body is provided at lower cost than the cBN tools.

The ceramic sintered body is improved in strength as the bonding strength of the crystal grain boundary is increased by the presence of Zr element at either one or both of: (1) the grain boundary between the crystal grains of the $Al_2O_3$; and (2) the grain boundary between the crystal grains of the $Al_2O_3$ and the crystal grains of the WC. The tool is thus improved in chipping resistance.

As the WC (tungsten carbide) is contained in the above-specified amount, the ceramic sintered body is improved in strength. Further, the ceramic sintered body is lowered in thermal expansion coefficient and thereby improved in chipping resistance as the WC is contained in the above-specified amount.

As the $ZrO_2$ (zirconia) is contained in the above-specified amount, the Zr element is sufficiently present at the crystal grain boundary so as to exert a grain boundary strengthening effect.

In the present invention, the ceramic sintered body may contain, as an impurity, any component other than the WC, $ZrO_2$ and $Al_2O_3$ in an amount that does not impair the effects of the present invention. In other words, the ceramic sintered body in which any component other than the WC, $ZrO_2$ and $Al_2O_3$ is contained as an impurity in an amount that does not impair the effects of the present invention is not excluded from the scope of the present invention and is included in the scope of the present invention.

(2) The ceramic sintered body may preferably contain 70.0 to 80.0 vol % of the WC.

When the ceramic sintered body contains 70.0 to 80.0 vol % of the WC, the tool is further improved in chipping resistance.

(3) The ceramic sintered body may preferably have a value of $I_M/(I_T+I_M)$ being in a range greater than 0.00 and smaller than or equal to 0.95 where, in X-ray diffraction of the ceramic sintered body, $I_M$ is a peak intensity of (−111) plane of the monoclinic structure of the $ZrO_2$; and $I_T$ is a peak intensity of (101) plane of the tetragonal structure of the $ZrO_2$. As to the term "Miller indices", a negative value of the index is denoted by a bar sign parallel to the index value for the sake of convenience in the present description and claims although it is common that a negative value of the index is denoted by a bar sign above the index value. For example, there is a case that the Miller indices are denoted as (−111) as mentioned above. In this case, the first index "−1" has the same meaning as "1" with a "bar sign" thereabove.

When the above value determined by X-ray diffraction is in the range greater than 0.00 and smaller than or equal to 0.95, the tool is improved in chipping resistance.

(4) The value of $[I_M/(I_T+I_M)]$ may more preferably be in the range of 0.52 to 0.95.

When the value of $[I_M/(I_T+I_M)]$ is in the range of 0.52 to 0.95, the tool is further improved in chipping resistance.

(5) There is provided an insert using the ceramic sintered body according to any one of the above (1) to (4).

The insert using the ceramic body according to the above aspect of the present invention has high wear resistance and chipping resistance and thus can suitably be used for a cutting tool.

(6) There is provided a cutting tool comprising the insert according to the above (5).

The cutting tool with the insert according to the above aspect of the present invention achieves compatibility between wear resistance and chipping resistance.

(7) There is provided a friction stir welding tool using the ceramic sintered body according to any one of the above (1) to (4).

The friction stir welding tool with the ceramic sintered body according to the above aspect of the present invention achieves compatibility between wear resistance and chipping resistance.

(8) There is provided an insert comprising: the ceramic sintered body according to any one of the above (1) to (4) as a base: and a surface coating layer formed on a surface of the base and containing at least one kind selected from the group consisting of a carbide of Ti, a nitride of Ti, a carbonitride of Ti, an oxycarbide of Ti, a oxynitride of Ti and a carboxynitride of Ti.

By the formation of the above surface coating layer, it is possible to harden the surface of the base and suppress oxidization of the WC at the surface of the base so that the tool is improved in wear resistance.

(9) There is provided a friction stir welding tool comprising: the ceramic sintered body according to any one of the above (1) to (4) as a base: and a surface coating layer formed on a surface of the base and containing at least one kind selected from the group consisting of a carbide of Ti, a nitride of Ti, a carbonitride of Ti, an oxycarbide of Ti, a oxynitride of Ti and a carboxynitride of Ti.

By the formation of the above surface coating layer, it is possible to harden the surface of the base and suppress oxidization of the WC at the surface of the base so that the tool is improved in wear resistance.

DESCRIPTION OF EMBODIMENTS

Hereinafter, the present invention will be described in detail below. In the present specification, the numerical range expression using "−" means a range including lower and upper limit values unless specifically stated otherwise. For example, the expression "10-20" means a range including a lower limit value of "10" and an upper limit value of "20". In other words, the expression "10-20" has the same meaning as "more than or equal to 10 and less than or equal to 20"

1. Ceramic Sintered Body

A ceramic sintered body according to an embodiment of the present invention includes $Al_2O_3$ (alumina), WC (tungsten carbide) and $ZrO_2$ (zirconia). In the ceramic sintered body, Zr element is present at either one or both of: (1) a grain boundary between crystal grains of the $Al_2O_3$; and (2) a grain boundary between crystal grains of the $Al_2O_3$ and crystal grains of the WC. The ceramic sintered body contains 55.0-97.5 vol % of the WC, 0.1-18.0 vol % of the $ZrO_2$, and the balance being $Al_2O_3$. Further, the $ZrO_2$ has a phase of tetragonal structure (T) or a mixed phase of tetragonal structure (T) and monoclinic structure (M).

The presence of Zr element at the boundary between $Al_2O_3$ crystal grains (alumina crystal grains) can be confirmed by the following procedure. The boundary (grain boundary) at which two $Al_2O_3$ crystal grains are adjacent to each other is observed with a scanning transmission electron microscope (STEM). The concentration of the Zr element across the crystal grain boundary is measured with an energy dispersive X-ray spectrometer (EDS). When the Zr element is present at the crystal grain boundary, there can be seen a high concentration peak of the Zr element at the crystal grain boundary.

The presence of Zr element at the boundary between an $Al_2O_3$ crystal grain (alumina crystal grain) and a WC crystal grain (tungsten carbide crystal grain) can be confirmed by the following procedure. The boundary (grain boundary) at which an $Al_2O_3$ crystal grain and a WC crystal grain are adjacent to each other is observed with a scanning transmission electron microscope (STEM). The concentration of the Zr element across the crystal grain boundary is measured with an energy dispersive X-ray spectrometer (EDS). When the Zr element is present at the crystal grain boundary, there can be seen a high concentration peak of the Zr element at the crystal grain boundary.

In the present embodiment, the ceramic sintered body contains 55.0-97.5 vol % of the WC (tungsten carbide). When the amount of the WC contained is 55.0 vol % or more, the ceramic sintered body is improved in strength. Further, the ceramic sintered body is lowered in thermal expansion coefficient and thereby improved in chipping resistance when the amount of the WC contained is 55.0 vol % or more. When the amount of the WC contained is 97.5 vol % or less, the ceramic sintered body contains a sufficient amount of the $Al_2O_3$ to obtain oxidation resistance and thus ensures sufficient wear resistance. The amount of the WC contained in the ceramic sintered body is preferably in the range of 70.0-80.0 vol % from the viewpoint of compatibility between low thermal expansion coefficient and sufficient wear resistance.

Furthermore, the ceramic sintered body contains 0.1-18.0 vol % of the $ZrO_2$ (zirconia) in the present embodiment. When the amount of the $ZrO_2$ contained is 0.1 vol % or more, the Zr element is sufficiently present at the crystal grain boundary so as to exert a grain boundary strengthening effect. When the amount of the $ZrO_2$ contained is 18.0 vol % or less, the ceramic sintered body achieves sufficient thermal properties so that the tool ensures chipping resistance. The amount of the $ZrO_2$ contained in the ceramic sintered body is preferably in the range of 0.1-10.0 vol % from the viewpoint of grain boundary strengthening and prevention of deterioration in thermal properties.

Herein, the term "vol % (volume %)" refers the content of each component assuming the total volume of all components contained in the ceramic sintered body as 100%. The content of each component in the ceramic sintered body can be determined by X-ray fluorescence analysis etc.

In the present embodiment, it is preferable that the ceramic sintered body has a value of $[I_M/(I_T+I_M)]$ being greater than 0.00 and smaller than or equal to 0.95 where, in X-ray diffraction of the ceramic sintered body, $I_M$ is the peak intensity of (−111) plane of the monoclinic structure of the $ZrO_2$ (zirconia); and $I_T$ is the peak intensity of (101) plane of the tetragonal structure of the $ZrO_2$ (zirconia). When the ratio value determined by X-ray diffraction ranges as specified above, the micro-crack strengthening effect of the monoclinic zirconia and the stress-induced transformation strengthening effect of the tetragonal zirconia are exerted in an efficient manner so that the tool is improved in chipping resistance. When the ratio value is greater than 0.95, the stress-induced transformation strengthening effect may not be sufficiently obtained. The upper limit of the ratio value is thus preferably set to 0.95. From the viewpoint of improvement in wear resistance by hardness improvement, the lower Emit of the ratio value is more preferably set to 0.52.

2. Production Method of Ceramic Sintered Body

There is no particular limitation on the method for production of the ceramic sintered body. One example of the production method of the ceramic sintered body will be explained below.

As raw materials for the ceramic sintered body, an $Al_2O_3$ powder (alumina powder), a WC powder (tungsten carbide powder) and a $ZrO_2$ powder (zirconia powder) are provided.

The particle diameter of the $Al_2O_3$ powder is not particularly limited. For example, the $Al_2O_3$ powder with an average particle diameter of the order of 0.5 μm can be used. The average particle diameter of the $Al_2O_3$ powder used as the raw material may be smaller than 0.5 μm and may be greater than 0.5 μm.

The particle diameter of the WC powder is not particularly limited. For example, the WC powder with an average particle diameter of the order of 0.7 μm can be used. The average particle diameter of the WC powder used as the raw material may be smaller than 0.7 μm and may be greater than 0.7 μm.

The particle diameter of the $ZrO_2$ powder is also not particularly limited. For example, the $ZrO_2$ powder with an average particle diameter of the order of 0.7 μm can be used. The $ZrO_2$ powder used can be a powder of $ZrO_2$ partially stabilized with yttria as a stabilizer. The average particle diameter of the $ZrO_2$ powder used as the raw material may be smaller than 0.7 μm and may be greater than 0.7 μm. The $ZrO_2$ powder used as the raw material is not limited to yttria-partially stabilized zirconia. Any other powder containing zirconia can be used as the raw material.

Each of the above average particle diameters of the respective raw material powders refer to a value measured with a laser diffraction particle size analyzer.

The respective raw material powders are weighed and mixed, followed by adding thereto a solvent and a dispersant. The resulting mixture is subjected to mixing and pulverization, thereby preparing a slurry. There is no particular limitation on the time of the mixing and pulverization.

The kind of the solvent is not particularly limited. As the solvent, there can be used acetone, ethanol or the like. The amount of the solvent added is not particularly limited and can be adjusted as appropriate.

The kind of the dispersant is not particularly limited. As the dispersant, there can be used FLOWLEN G-700 (available from KYOEISHA CHEMICAL CO., LTD.), SN-DISPERSANT 9228 (available from SAN NOPCO LIMITED), MALIALIM AKM-0531 (available from NOF CORPORATION), KAOCER 8000 (available from KAO CORPORATION) or the like. The amount of the dispersant added is not particularly limited and is preferably in the range of 0.01-4.0 parts by mass relative to the total mass (100 parts by mass) of all of the raw material powders.

After the preparation of the slurry, a mixed powder material is formed from the slurry. In the mixed powder material formed from the slurry, particles of alumina, particles of tungsten carbide and particles of zirconia are present in a mixed state. In the present embodiment, the mixed powder material is formed by subjecting the slurry to degassing while warming with hot water to remove the solvent from the slurry, and then, sifting the resulting powder through a sieve.

After the formation of the mixed powder material, the ceramic sintered body is obtained by hot pressing the mixed powder material. The hot pressing is performed by e.g. filling a mold of carbon with the mixed powder material, and then, heating the mixed powder material while uniaxially pressing the mixed powder material. With this, the mixed powder material undergoes sintering. There is thus obtained the ceramic sintered body.

There is no particular limitation on the conditions of the hot pressing. For example, the hot pressing can be performed under the following conditions: a sintering temperature of 17004900° C.; a sintering time of 1-5 hours; a pressure of 30-50 MPa (megapascal); and an atomospheric gas of argon (Ar).

After the hot pressing, the ceramic sintered body may be subjected to shaping or surface finishing by at least one of cutting, grinding and polishing.

It is feasible to control the distribution of the Zr element and the crystal phase of the $ZrO_2$ in in the ceramic sintered body by adjusting the amount of the stabilizer solid-soluted in the $ZrO_2$ powder. For example, the proportion of the monoclinic zirconia can be increased by using the $ZrO_2$ powder with a low degree of stabilization.

3. Cutting Tool

A cutting tool according to an embodiment of the present invention includes an insert using the above-mentioned ceramic sintered body. The cutting tool in which the insert using the ceramic sintered body is placed as a throw-away chip is utilized as a high performance cutting tool. The cutting tool according to the present embodiment shows less edge wear and less edge chipping and thereby attains a long lifetime in not only high-speed machining of normal cast iron, but also high-speed machining of difficult-to-cut materials such as ductile cast iron and heat-resistant alloys. The cutting tool according to the present embodiment, even when utilized as a rough cutting tool, enables long-time cutting with good surface roughness and dimensional accuracy because the cutting edge of the cutting tool, which exerts an influence on the surface roughness and dimensional accuracy etc. of workpiece, has high wear resistance. In the present invention, the cutting tool means a cutting tool in a board sense and includes all of tools for turning, milling and the like.

Examples of the cutting tool will be explained below with reference to the drawings.

Figure 1:
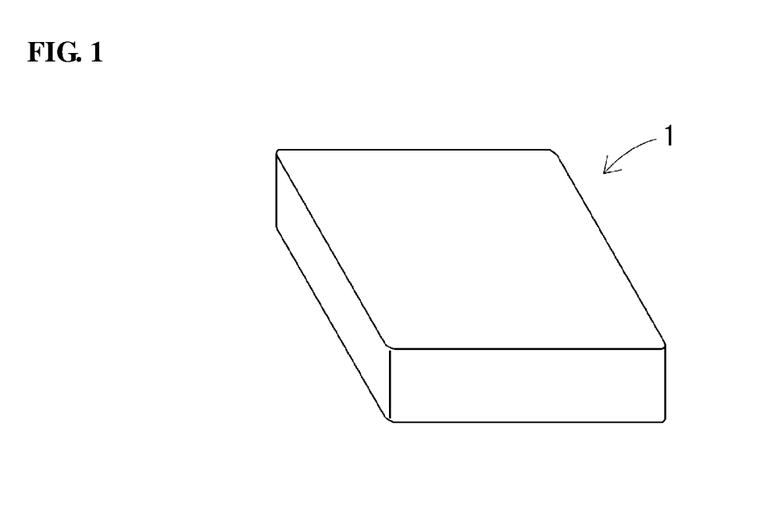
FIG. 1 is a perspective view of an insert using a ceramic sintered body according to an embodiment of the present invention.
Figure 2:
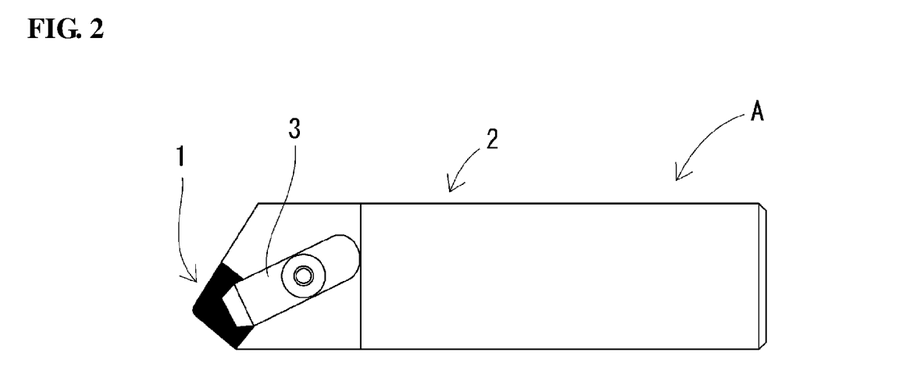
FIG. 2 is a plan view of a cutting tool according to an embodiment of the present invention.

FIG. 1 shows the insert 1 using the ceramic sintered body. FIG. 2 shows the cutting tool A. The cutting tool A includes: an outer-diameter processing holder 2; the insert 1 set in the holder 2; a holding die 3 holding the insert 1.

Figure 3:
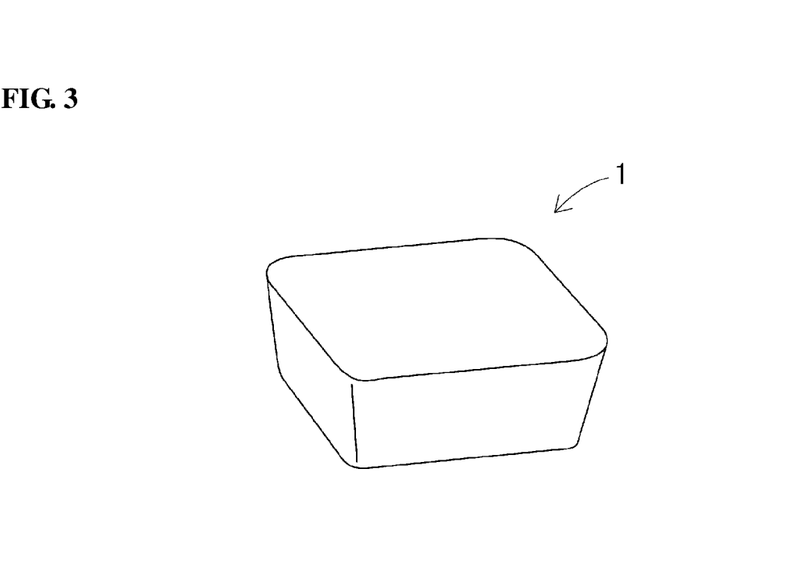
FIG. 3 is a perspective view of an insert using a ceramic sintered body according to an embodiment of the present invention.
Figure 4:
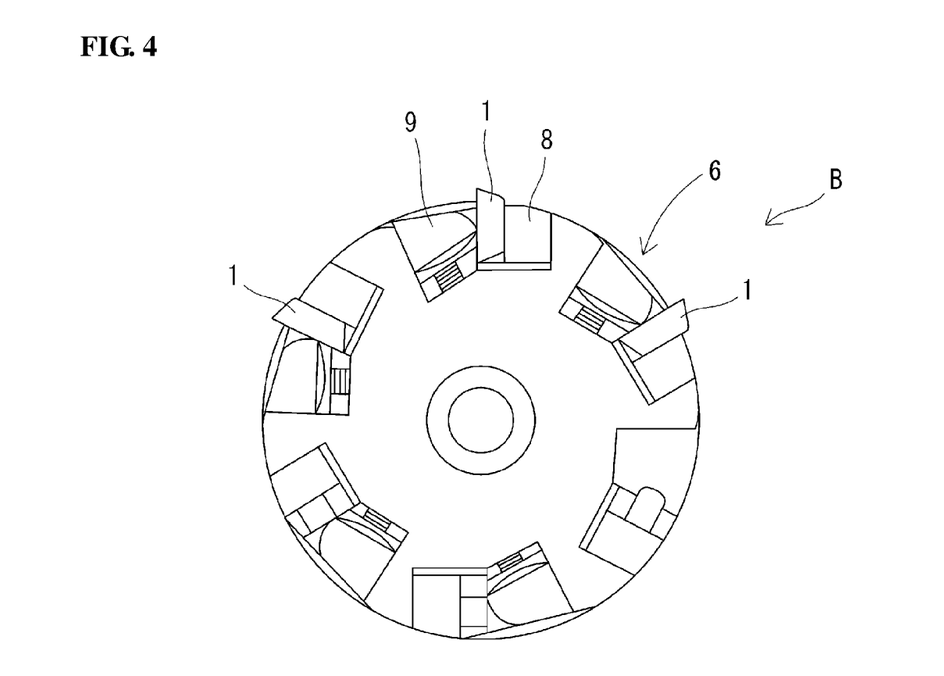
FIG. 4 is a plan view of a cutting tool according to an embodiment of the present invention.
Figure 5:
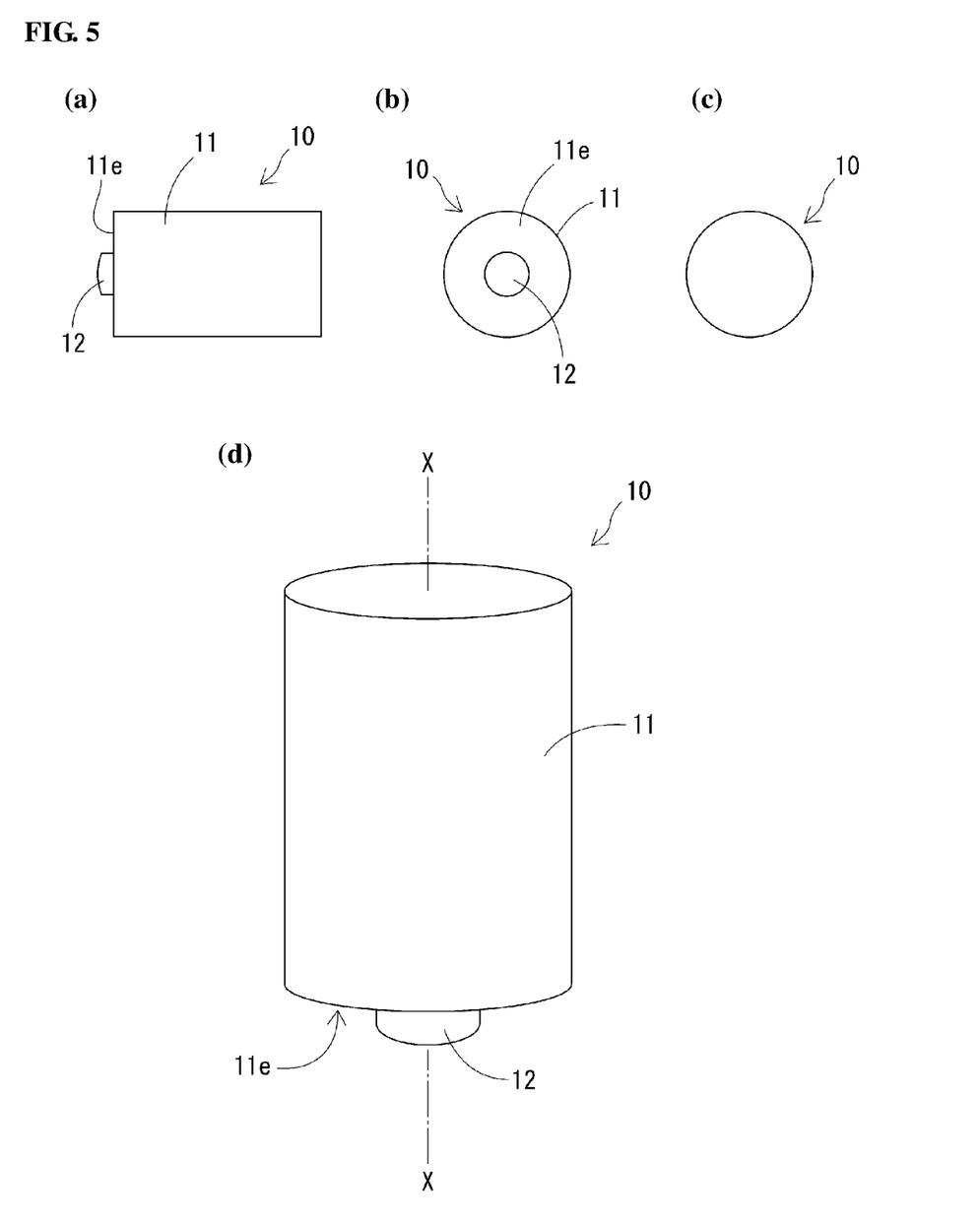
FIG. 5 is a perspective view etc. of a friction stir welding tool according to an embodiment of the present invention.

FIG. 3 shows the insert 1 for use in a milling cutter as the cutting tool B. FIG. 4 shows the cutting tool B (milling cutter). The cutting tool B includes a milling cutter holder 6 provided with an insert holding cartridge 8 and an insert holding wedge 9 to hold the insert 1.

According to an alternative embodiment of the present invention, there is provided a cutting tool whose insert includes the above-mentioned ceramic sintered body as a base and a surface coating layer formed on a surface of the base and containing at least one kind selected from the group consisting of a carbide of Ti, a nitride of Ti, a carbonitride of Ti, an oxycarbide of Ti, a oxynitride of Ti and a carboxynitride of Ti. By the formation of the surface coating layer, it is possible to increase the surface hardness of the tool and prevent the tool from undergoing wear by reaction or seizing with workpiece. Consequently, the tool is improved in wear resistance.

There are no particular limitations on the kind of the carbide of Ti, the nitride of Ti, the carbonitride of Ti, the oxycarbide of Ti, the oxynitride of Ti and the carboxynitride of Ti. Among others, preferred are TiN, TiAlN and TiAlCrN.

There is also no particular limitation on the thickness of the surface coating layer. The thickness of the surface coating layer is preferably 0.02-15.0 μm, more preferably 0.05-10.0 μm, in terms of wear resistance.

4. Friction Stir Welding Tool

According to an embodiment of the present invention, there is provided a friction stir welding tool, that is, a tool for friction stir welding. Herein, an explanation will be given of friction stir welding. In the friction stir welding, a protrusion portion (probe portion) of the friction stir welding tool is pressed, while rotating, onto workpieces. Then, parts of the workpieces are softened by friction heat. The softened parts are stirred by the protrusion portion, whereby the workpieces are welded to each other.

An example of the friction stir welding tool will be explained below with reference to the drawings.

FIG. 5(a) to (d) respectively show a front view, a bottom view, a top view and a perspective view of the friction stir welding tool 10. The friction stir welding tool 10 is produced using the ceramic sintered body. In the present embodiment, the friction stir welding tool 10 includes a substantially cylindrical column-shaped body part 11 and a probe portion 12. The probe portion 12 is in the form of a substantially cylindrical column-shaped protrusion at the center of a front end portion 11e of the body part 11. An axis of the probe portion 12 is in agreement with an axis X of the body part 11. The respective dimensions of the friction stir welding tool 10 can be set to arbitrary values.

Figure 6:
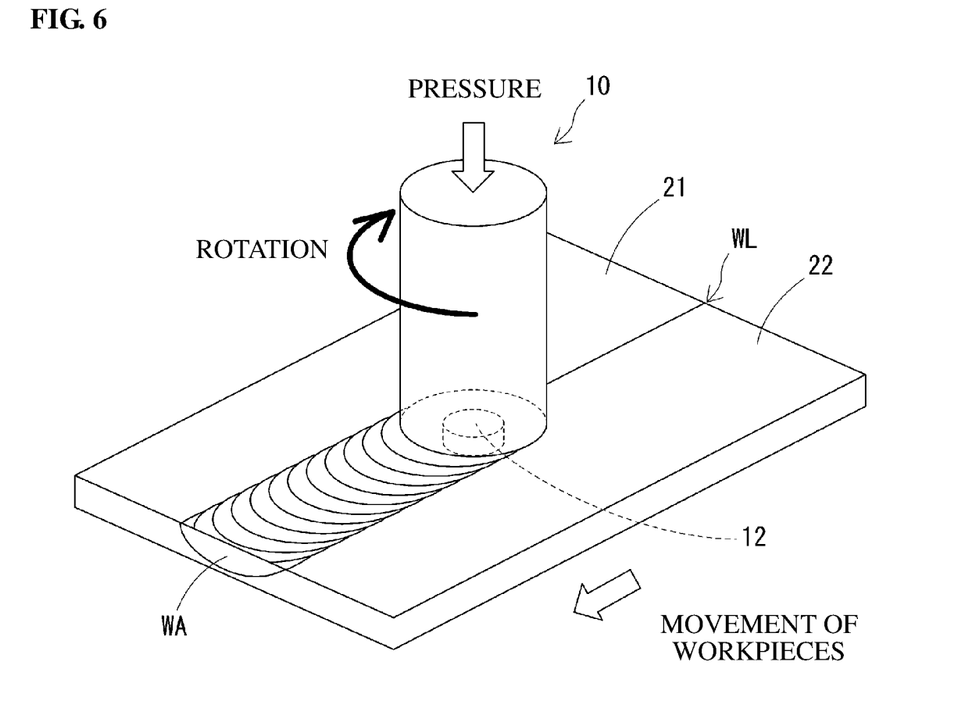
FIG. 6 is a perspective view showing the state of use of the friction stir welding tool according to the embodiment of the present invention.

FIG. 6 shows the state of use of the friction stir welding tool 10. The friction stir welding tool 10 is used by being mounted to a welding machine. Under the application of a pressure from the welding machine, the probe portion 12 of the friction stir welding tool 10 is pressed, while rotating, onto a welding line WL that is a boundary between workpieces 21 and 22. Then, the workpieces 21 and 22 are moved relative to the friction stir welding tool 10 in a direction indicated by a void arrow in FIG. 6 in the state that the probe portion 12 is kept pressed onto the workpieces 21 and 22. This allows relative movement of the friction stir welding tool 10 along the welding line WL. As the workpieces 21 and 22, there can be used plates of steel. Plates of other arbitrary metal material may alternatively be used as the workpieces. Plastic flow occurs in the vicinity of the welding line WL between the workpieces 21 and 22 by heat of friction between the probe portion 12 and the workpiece. Plastically-flowing parts of the workpieces 21 and 22 are stirred by the probe portion 12, thereby forming a welded area WA. By this welded area WA, the workpieces 21 and 22 are welded to each other.

According to an alternative embodiment of the present invention, there is provided a friction stir welding tool that includes the above-mentioned ceramic sintered body as a base and a surface coating layer formed on a surface of the base and containing at least one kind selected from the group consisting of a carbide of Ti, a nitride of Ti, a carbonitride of Ti, an oxycarbide of Ti, a oxynitride of Ti and a carboxynitride of Ti. By the formation of the surface coating layer, it is possible to increase the surface hardness of the tool and prevent the tool from undergoing wear by reaction or seizing with workpiece. Consequently, the tool is improved in wear resistance.

There are no particular limitations on the kind of the carbide of Ti, the nitride of Ti, the carbonitride of Ti, the oxycarbide of Ti, the oxynitride of Ti and the carboxynitride of Ti. Among others, preferred are TiN, TiAlN and TiAlCrN.

There is also no particular limitation on the thickness of the surface coating layer. The thickness of the surface coating layer is preferably 0.02-15.0 μm, more preferably 0.05-10.0 μm, in terms of wear resistance.

EXAMPLES

The present invention will be described in more detail below by way of the following examples.

1. Experiment 1 (Sample Nos. 1-24)

(1) Production of Ceramic Sintered Bodies

For production of each sample, a commercially available $Al_2O_3$ powder with an average particle diameter of 0.5 μm, a commercially available WC powder with an average particle diameter of 0.7 μm and a commercially available $ZrO_2$ powder with an average particle diameter of 1.0 μm were mixed together at a mixing ratio as shown in TABLE 1. The resulting powder mixture, acetone and a dispersant were put in a resin pot and subjected to mixing and pulverization for 72 hours, thereby obtaining a slurry. The amount of the dispersant added was 0.05 parts by mass relative to the total amount (100 parts by mass) of all the raw material powders. A mixed powder material was prepared by subjecting the slurry to hot water drying and thereby removing the acetone from the slurry. Then, the mixed powder material was formed into a ceramic sintered body by hot pressing (1700-1900° C.; 30-50 MPa) in the atmosphere of Ar. The crystal phase of the $ZrO_2$ in the ceramic sintered body was controlled by adjusting the amount of the stabilizer solid-soluted in the $ZrO_2$ powder.

The obtained ceramic sintered body was tested by X-ray analysis (mirror reflection), room-temperature strength measurement and room-temperature hardness measurement. Further, a test piece of the ceramic sintered body was subjected to mirror polishing, acid treatment and thermal etching. The structure of the test piece was observed with an electron microscope to determine a crystal grain size of the ceramic sintered body from the photomicrograph of the structure by an intercept method. Furthermore, the crystal grain boundaries of the ceramic sintered body were observed with a STEM to check the presence or absence of Zr element at the respective grain boundaries.

The above-obtained ceramic sintered body was processed by grinding into a chip dimension of ISO SNGN432. A cutting tool was produced using this processed ceramic sintered body. The produced cutting tool was tested by wear resistance test (wear acceleration test) on gray cast iron rough processing. The respective test methods were as follows.

As comparative samples, conventional types of tools such as black ceramic tool (sample No. 23; $Al_2O_3$—TiC tool) and silicon nitride-based tool (sample No. 24) were used.

The compositions etc. of the respective samples are shown in TABLE 1. In the respective tables of the present specification, the following expressions have the following meanings. The term "vol %" is expressed as "volume %". The term "T" refers to a tetragonal structure. The term "M" refers to a monoclinic structure. In TABLES 1 and 2, the symbol "*" means that the sample was out of the scope of the present invention. As to the presence or absence of the Zr element, the symbol "○" indicates the presence of the Zr element; and the symbol "X" indicates the absence of the Zr element.

TABLE 1

| No. | Composition Ratio (vol %) | | | $ZrO_2$ Crystal Phase | $I_M/(I_T + I_M)$ | Presence of Zr at $Al_2O_3$/WC Grain Boundary | Presence of Zr at $Al_2O_3$/$Al_2O_3$ Grain Boundary | Average Grain Size (μm) | |
|---|---|---|---|---|---|---|---|---|---|
| | $Al_2O_3$ | WC | $ZrO_2$ | | | | | $Al_2O_3$ | WC |
| 1 | 23.0 | 75.0 | 2.0 | M, T | 0.69 | ○ | ○ | 0.46 | 0.31 |
| 2 | 23.0 | 75.0 | 2.0 | M, T | 0.68 | ○ | X | 0.46 | 0.32 |
| 3 | 23.0 | 75.0 | 2.0 | M, T | 0.69 | X | ○ | 0.47 | 0.30 |
| 4 (*) | 23.0 | 75.0 | 2.0 | M, T | 0.67 | X | X | 0.45 | 0.34 |
| 5 (*) | 68.0 | 30.0 | 2.0 | M, T | 0.68 | ○ | ○ | 0.75 | 0.29 |
| 6 (*) | 58.0 | 40.0 | 2.0 | M, T | 0.65 | ○ | ○ | 0.68 | 0.30 |
| 7 | 43.0 | 55.0 | 2.0 | M, T | 0.64 | ○ | ○ | 0.58 | 0.30 |
| 8 | 38.0 | 60.0 | 2.0 | M, T | 0.65 | ○ | ○ | 0.55 | 0.26 |
| 9 | 28.0 | 70.0 | 2.0 | M, T | 0.64 | ○ | ○ | 0.50 | 0.29 |
| 10 | 18.0 | 80.0 | 2.0 | M, T | 0.67 | ○ | ○ | 0.44 | 0.28 |
| 11 | 8.0 | 90.0 | 2.0 | M, T | 0.71 | ○ | ○ | 0.39 | 0.26 |
| 12 | 3.0 | 95.0 | 2.0 | M, T | 0.68 | ○ | ○ | 0.28 | 0.28 |
| 13 | 0.5 | 97.5 | 2.0 | M, T | 0.63 | ○ | ○ | 0.28 | 0.27 |
| 14 (*) | 0.0 | 98.0 | 2.0 | M, T | 0.59 | ○ | ○ | 0.28 | 0.26 |
| 15 (*) | 25.0 | 75.0 | 0.0 | M, T | — | X | X | 0.51 | 0.33 |
| 16 | 24.9 | 75.0 | 0.1 | M, T | 0.70 | ○ | ○ | 0.50 | 0.28 |
| 17 | 20.0 | 75.0 | 5.0 | M, T | 0.69 | ○ | ○ | 0.46 | 0.31 |
| 18 | 15.0 | 75.0 | 10.0 | M, T | 0.42 | ○ | ○ | 0.48 | 0.32 |
| 19 | 7.0 | 75.0 | 18.0 | M, T | 0.30 | ○ | ○ | 0.45 | 0.32 |
| 20 (*) | 5.0 | 75.0 | 20.0 | M, T | 0.11 | ○ | ○ | 0.41 | 0.33 |
| 21 (*) | 23.0 | 75.0 | 2.0 | C | — | ○ | ○ | 0.50 | 0.34 |
| 22 | 23.0 | 75.0 | 2.0 | T | — | ○ | ○ | 0.49 | 0.30 |
| 23 (*) | black ceramic ($Al_2O_3$—TiC) | | | — | — | — | — | — | — |
| 24 (*) | silicon nitride | | | — | — | — | — | — | — |

(2) Test Methods (2.1) Test on Presence or Absence of Zr Element at Grain Boundary The presence or absence of the Zr element at grain boundaries of each sample was tested by the following method.

<Step 1> A thin test piece with four sides of 100 nm was cut out from any arbitrary part of the sample. An arbitrary surface of the test piece was observed with a STEM to check a grain boundary between $Al_2O_3$ crystal grains and a grain boundary between $Al_2O_3$ and WC crystal grains.

<Step 2> The concentration of the Zr element was measured with an EDS at five locations on each of the grain boundary between the $Al_2O_3$ crystal grains and the grain boundary between the $Al_2O_3$ and WC crystal grains of the sample. The presence or absence of the Zr element at the crystal grain boundary was determined based on the measurement results.

(2.2) Test on Wear Resistance

The above-obtained tool was tested by wear resistance test (wear acceleration test) on gray cast iron rough processing. The test conditions were as follows. The flank of the tool after the cutting was observed under magnification with a digital microscope to evaluate the width of wear of the tool flank as a flank wear amount. The flank wear amount is also simply referred to as "wear amount".

chip shape: SNGN432-TN
workpiece material: FC200 (with casting surface)
cutting speed: 1000 m/min
cutting depth: 1.5 mm
feeding rate: 0.2 mm/rev.
cutting environment: dry cutting test
evaluation: flank wear amount after 1-pass
evaluation criteria
"⊚": wear amount≤0.65 mm;
"○": 0.65 mm<wear amount≤0.90 mm
"X": 0.90 mm<wear amount (2.3) Test on Mechanical Properties A test piece was prepared from the sample as follows and tested for its mechanical properties such as bending stress and hardness. The test piece was in the shape of a prism rectangular in cross section with a length dimension of 40 mm, a width dimension of 4 mm and a thickness dimension of 3 mm. The bending strength of each sample was measured, in terms of three-point bending strength, according to JIS R 1601 under the condition of an external span length (span) of 30 mm. The hardness of each sample was measured in terms of Vickers hardness according to JIS R 1610.

(2A) Tests on Thermal Properties

The thermal expansion coefficient of each sample was tested at 600° C. according to JIS R 1618. The thermal conductivity of each sample was tested at room temperature according to JIS R 1611.

(3) Test Results

The test results of the respective samples are shown in TABLE 2.

TABLE 2

| | Properties of Sintered Body | | | | Wear Resistance Test Results | |
|---|---|---|---|---|---|---|
| No. | Bending Strength (MPa) | Hardness | Thermal Expansion Coefficient (×10$^{-6}$/K) | Thermal Conductivity (W/m·K) | Wear Amount (mm) | Evaluation |
| 1 | 1950 | 2440 | 5.5 | 56.8 | 0.64 | ⊚ |
| 2 | 1310 | 2450 | 5.5 | 56.7 | 0.75 | ○ |
| 3 | 1280 | 2420 | 5.5 | 56.8 | 0.82 | ○ |
| 4 (*) | 980 | 2430 | 5.5 | 56.7 | — | chipped |
| 5 (*) | 1520 | 2210 | 6.2 | 33.0 | — | chipped |
| 6 (*) | 1650 | 2300 | 6.2 | 34.5 | — | chipped |
| 7 | 1760 | 2260 | 5.9 | 42.5 | 0.75 | ○ |
| 8 | 1780 | 2360 | 5.8 | 45.2 | 0.73 | ○ |
| 9 | 1900 | 2410 | 5.5 | 51.7 | 0.65 | ⊚ |
| 10 | 2200 | 2490 | 5.2 | 60,1 | 0.65 | ⊚ |
| 11 | 2450 | 2580 | 5.0 | 71.7 | 0.71 | ○ |
| 12 | 2560 | 2620 | 4.8 | 75.7 | 0.82 | ○ |
| 13 | 2470 | 2600 | 4.6 | 75.8 | 0.89 | ○ |
| 14 (*) | 2450 | 2580 | 4.2 | 76.0 | 0.92 | X |
| 15 (*) | 920 | 2430 | 5.4 | 57.1 | — | chipped |
| 16 | 1890 | 2480 | 5.4 | 57.0 | 0.63 | ⊚ |
| 17 | 1950 | 2440 | 5.5 | 56.8 | 0.64 | ⊚ |
| 18 | 1970 | 2380 | 5.6 | 51.1 | 0.65 | ⊚ |
| 19 | 2050 | 2300 | 5.8 | 50.5 | 0.70 | ○ |
| 20 (*) | 2200 | 2220 | 5.9 | 49.7 | 0.76 | chipped |
| 21 (*) | 1200 | 2300 | 5.7 | 56.0 | — | chipped |
| 22 | 2000 | 2370 | 5.6 | 56.3 | 0.74 | ○ |
| 23 (*) | 800 | 2240 | 7.9 | 21.0 | — | chipped |
| 24 (*) | 1200 | 1750 | 3.0 | 15.0 | 1.55 | X |

Presence of Zr Element

As is seen from the test results of sample Nos. 1-4, each of the sintered bodies of sample Nos. 1-3 in which the Zr element was present at least either one of the grain boundary between $Al_2O_3$ crystal grains and the grain boundary between $Al_2O_3$ and WC crystal grains was superior in wear resistance. In particular, the tool was provided with further superior wear resistance by the presence of the Zr element at both of the above crystal grain boundaries as in sample No. 1.

Influence of WC Content and $ZrO_2$ Content

The test results of sample Nos. 1 and 5-20 are now compared. The wear amounts of the tools with samples Nos. 1, 7-13 and 16-19, each of which was within the scope of the present invention, were evaluated as "⊚" or "○".

On the other hand, the tools with sample Nos. 5-6 in which the WC content was less than 55.0 vol % were each chipped. The wear amount of the tool with sample No. 14 in which the WC content was more than 97.5 vol % was evaluated as "X". It is apparent from these results that: when the WC content of the sintered body is too less, there occurs chipping of the tool due to increase of thermal expansion coefficient; and, when the WC content of the sintered body is excessive, the wear amount of the tool becomes increased to be larger than a reference value (0.90 mm) due to deterioration of oxidation resistance.

The wear amounts of the tools with sample Nos. 9-10 in which the WC content was in the range of 70.0-80.0 vol % were evaluated as "⊚". It is thus apparent that, when the WC content of the sintered body is in the range of 70.0-80.0 vol %, the tool shows particularly superior wear resistance.

Further, the tool with sample No. 15 in which the $ZrO_2$ content was less than 0.1 vol % and the tool with sample No. 20 in which the $ZrO_2$ content was more than 18.0 vol % were each chipped. It is apparent from these results that: when the $ZrO_2$ content of the sintered body is too less, there occurs chipping of the tool due to lack of grain boundary strengthening; and, when the $ZrO_2$ content of the sintered body is excessive, there occurs chipping of the tool due to increase of thermal expansion coefficient.

The wear amounts of the tools with sample Nos. 16-18 in which the $ZrO_2$ content was in the range of 0.1-10 vol % were evaluated as "⊚". It is thus apparent that, when the $ZrO_2$ content of the sintered body is in the range of 0.1-10 vol %, the tool shows particularly superior wear resistance.

State of $ZrO_2$ Phase

The test results of sample Nos. 1, 21 and 22 are next compared. The wear amounts of the tool with sample No. 22 in which the $ZrO_2$ was in the form of a tetragonal phase and the tool with sample No. 1 in which the $ZrO_2$ was in the form of a mixed tetragonal-monoclinic phase were respectively evaluated as "○" and "⊚". In particular, sample No. 1 in which the $ZrO_2$ was in the form of a mixed tetragonal-monoclinic phase was preferred because, as the wear amount of the tool was evaluated as "⊚", the tool was improved in wear resistance.

On the other hand, the tool with sample No. 21 in which the $ZrO_2$ was in the form of a cubic phase was chipped.

Comparison with Conventional Tools

The wear amount evaluation results of the conventional tools with sample Nos. 23 and 24 were not good.

By contrast, the tools with samples Nos. 1-3, 7-13, 16-19 and 22, each of which was within the scope of the present invention, were superior in wear resistance without causing chipping.

2. Experiment 2 (Sample Nos. 25-27)

(1) Production of Ceramic Sintered Bodies and Test Methods

Samples were produced in the same manner as in Experiment 1. In these samples, the content ratio of monoclinic and tetragonal $ZrO_2$ (zirconia) was changed by using varying amounts of $ZrO_2$ powder with different solid solution amounts of stabilizer. The thus-produced samples were tested by wear resistance test etc. in the same manner as in Experiment 1.

(2) Test Results

The compositions etc. of the respective samples are shown in TABLE 3. The test results of the respective samples are shown in TABLE 4.

TABLE 3

| | Composition Ratio (vol %) | | | $ZrO_2$ Crystal Phase | $I_M/(I_T+I_M)$ | Presence of Zr at $Al_2O_3$/WC Grain Boundary | Presence of Zr at $Al_2O_3$/$Al_2O_3$ Grain Boundary | Average Grain Size (μm) | |
|---|---|---|---|---|---|---|---|---|---|
| No. | $Al_2O_3$ | WC | $ZrO_2$ | | | | | $Al_2O_3$ | WC |
| 25 | 23.0 | 75.0 | 2.0 | M, T | 0.12 | ○ | ○ | 0.50 | 0.33 |
| 26 | 23.0 | 75.0 | 2.0 | M, T | 0.52 | ○ | ○ | 0.48 | 0.31 |
| 27 | 23.0 | 75.0 | 2.0 | M, T | 0.95 | ○ | ○ | 0.46 | 0.31 |

TABLE 4

| | Properties of Sintered Body | | | | Wear Resistance Test Results | |
|---|---|---|---|---|---|---|
| No. | Bending Strength (MPa) | Hardness | Thermal Expansion Coefficient (×10⁻⁶/K) | Thermal Conductivity (W/m · K) | Wear Amount (mm) | Evaluation |
| 25 | 1980 | 2390 | 5.6 | 56.5 | 0.70 | ○ |
| 26 | 1960 | 2420 | 5.5 | 56.6 | 0.64 | ⊚ |
| 27 | 1890 | 2460 | 5.5 | 56.8 | 0.63 | ⊚ |

The wear amounts of the tools with samples No. 25-27 in which the value of $[I_M/(I_T+I_M)]$ was greater than 0.00 and smaller than or equal to 0.95 were evaluated as "○" or "⊚".

The reason for this result is assumed to be that there occurred no chipping of the tool under the micro-crack strengthening effect of the monoclinic zirconia and the stress-induced transformation strengthening effect of the tetragonal zirconia so that the wear amount of the tool became smaller than or equal to a reference value (i.e. smaller than or equal to 0.90 mm).

It is more preferable that the value of $[I_M/(I_T+I_M)]$ is greater than or equal to 0.52 and smaller than or equal to 0.95 for more improvement in the wear resistance of the tool.

3. Experiment 3 (Sample Nos. 28-34)

(1) Production of Ceramic Sintered Bodies and Test Methods

Tools were produced in the same manner as in Experiment 1, followed by forming coating layers of TiN, TiAlN and TiAlCrN on surfaces of the sample tools, respectively. The thus-obtained tools were tested by wear resistance test etc. in the same manner as in Experiment 1. Herein, the substrate No. in TABLE 5 designates the sample number (No.) in TABLE 1.

(2) Test Results

The test results of the respective samples are shown in TABLE 5.

TABLE 5

| | | | Wear Resistance Test Results | |
|---|---|---|---|---|
| No. | Substrate No. | Coating | Wear Amount | Evaluation |
| 28 | 7 | TiN | 0.69 | ○ |
| 29 | 12 | TiN | 0.68 | ○ |
| 30 | 16 | TiN | 0.43 | ⊚ |
| 31 | 19 | TiN | 0.66 | ○ |
| 32 | 1 | TiAlN | 0.41 | ⊚ |
| 33 | 1 | TiAlCrN | 0.40 | ⊚ |
| 34 (*) | 24 | TiN | 1.45 | X |

The wear amounts of sample Nos. 28-33 in each of which the coating layer was formed on the surface of the substrate was decreased as compared with the case of using only the corresponding respective sintered bodies as the samples. It is apparent from these results that the tool, when provided with a surface coating layer of Ti compound, shows further improved wear resistance.

The wear amount of sample No. 34 in which the coating layer was formed on the silicon nitride-based tool (sample No. 24) that was out of the scope of the present invention became decreased as compared with the case of sample No. 24 with no coating layer, but did not became smaller than or equal to a reference value (i.e. smaller than or equal to 0.65 mm).

4. Summary of Experiments 1-3

It has been shown by the above test results that the cutting tool according to the present invention attains high wear resistance and chipping resistance.

5. Experiment 4 (Friction Stir Welding Test)

(1) Production of Ceramic Sintered Bodies and Test Methods

Samples (ceramic sintered bodies) were produced in the same manner as in Experiment 1, and then, tested by friction stir welding test under the following conditions. The test was performed using each of the tools with samples Nos. 4, 6, 14, 23 and 24 that were within the scope of the present invention and with samples No. 1, 7, 12 and 32 that were out of the scope of the present invention. As noted below under the symbol"✕" the smaller the wear amount, the better the evaluation result in order of a, b and c.

Test Conditions workpieces: SUS 304 (t=2 mm)
shield gas: argon (Ar)
lowering speed: 0.5 minis
tool indentation load: $1.2 \times 10^4$ N
rotation speed: 600 rpm
holding time: 1 sec
weld spot number: 60
evaluation: wear amount of shoulder portion after 60 weld spots
a: wear amount smaller than 0.3 mm
b: wear amount larger than or equal to 0.3 mm and smaller than 0.5
c: wear amount larger than or equal to 0.5 mm, or occurrence of tool chipping ※ (good) evaluation result a→evaluation result b→evaluation result c (bad)

(2) Test Results

The tools with sample Nos. 4, 6, 14, 23 and 24 were evaluated as c; the tools with samples Nos. 7 and 12 were evaluated as b; and the tools with samples Nos. 1 and 32 were evaluated as a.

It has been shown by these test results that the friction stir welding tool according to the present invention attains high wear resistance and chipping resistance.

The present invention is not limited to the above-mentioned embodiments. Various changes and modifications are possible within the scope of the claims of the present invention.

DESCRIPTION OF REFERENCE NUMERALS

1: Insert
2: Outer diameter processing holder
3: Holding die
6: Milling cutter holder
8: Insert installation cartridge
9: Insert mounting wedge
10: Friction stir welding tool
11: Body part
11e: Front end portion
12: Probe portion
21: Workpiece
22: Workpiece
A, B: Cutting tool
WA: Welded area
WL: Welding line
X: Axis

What is claimed is:

1. A ceramic sintered body, comprising $Al_2O_3$, WC and $ZrO_2$,
   wherein Zr element is present at either one or both of: (1) a grain boundary between crystal grains of the $Al_2O_3$; and (2) a grain boundary of crystal grains of the $Al_2O$ and crystal grains of the WC,
   wherein the ceramic sintered body contains 55.0 to 97.5 vol % of the WC, 0.1 to 18.0 vol % of the $ZrO_2$, and the balance being the $Al_2O_3$,
   wherein the $ZrO_2$ is in a phase of tetragonal structure or a mixed phase of tetragonal and monoclinic structures, and
   wherein the ceramic sintered body has a value of $I_M/(I_T+I_M)$ being greater than 0.52 and smaller than or equal to 0.95 where, in X-ray diffraction of the ceramic sintered body, $I_M$ is a peak intensity of (−111) plane of the monoclinic structure of the $ZrO_2$; and $I_T$ is a peak intensity of (101) plane of the tetragonal structure of the $ZrO_2$.

2. The ceramic sintered body according to claim 1, wherein the sintered ceramic body contains 70.0 to 80.0 vol % of the WC.

3. An insert comprising the ceramic sintered body according to claim 1.

4. A cutting tool comprising the insert according to claim 3.

5. A friction stir welding tool comprising the ceramic sintered body according to claim 1.

6. The cutting tool according to claim 4, wherein the insert comprises:
   the ceramic sintered body as a substrate; and
   a surface coating layer formed on a surface of the substrate and containing at least one kind selected from the group consisting of a carbide of Ti, a nitride of Ti, a carbonitride of Ti, an oxycarbide of Ti, a oxynitride of Ti and a carboxynitride of Ti.

7. The friction stir welding tool according to claim 5, comprising:
   the ceramic sintered body as a substrate; and
   a surface coating layer formed on a surface of the substrate and containing at least one kind selected from the group consisting of a carbide of Ti, a nitride of Ti, a carbonitride of Ti, an oxycarbide of Ti, a oxynitride of Ti and a carboxynitride of Ti.

* * * * *